United States Patent [19]

Shepherd

[11] Patent Number: 5,221,842
[45] Date of Patent: Jun. 22, 1993

[54] SELF-CONTAINED CALIBRATORS/IRRADIATORS FOR PERSONAL DOSIMETERS

[75] Inventor: J. L. Shepherd, San Fernando, Calif.

[73] Assignee: J. L. Shepherd & Assoc, San Fernando, Calif.

[21] Appl. No.: 775,737

[22] Filed: Oct. 11, 1991

[51] Int. Cl.⁵ .......................... G21K 5/00; G21H 5/00
[52] U.S. Cl. ................................. 250/252.1; 250/507.1
[58] Field of Search ................ 250/252.1, 507.1, 506.1

[56] References Cited

U.S. PATENT DOCUMENTS 3,604,934 9/1971 Melillo et al. ..................... 250/507.1

FOREIGN PATENT DOCUMENTS 1614563 11/1972 Fed. Rep. of Germany ... 250/507.1

Primary Examiner—Paul M. Dzierzynski
Assistant Examiner—Richard Hanig
Attorney, Agent, or Firm—Wagner & Middlebrook

[57] ABSTRACT

A portable self contained calibrator/irradiator for calibrating large numbers of several types of personal dosimetry equipment includes a generally cylindrical housing having relatively heavy exterior lead, lined walls with a heavy cover also lined with lead shielding material. An electrically controlled and powered actuator raises and lowers the cover to provide access to the interior. A centrally located shielding structure provides a guide for a rod carrying one or more sources of nuclear radiation such as 137Cs which are moved vertically along the axis of the shielding structure to a guide permitting 360° radiation of dosimeters arranged in a circular rack on a turntable inside the housing walls. The source rod includes tungsten sheathing above and below the radioactive sources. Interlock switches prevent opening the cover when the source rod is in radiating position. An alternate embodiment includes an attenuator in the form of a thin tungsten sleeve slidable over the radiation source.

18 Claims, 7 Drawing Sheets

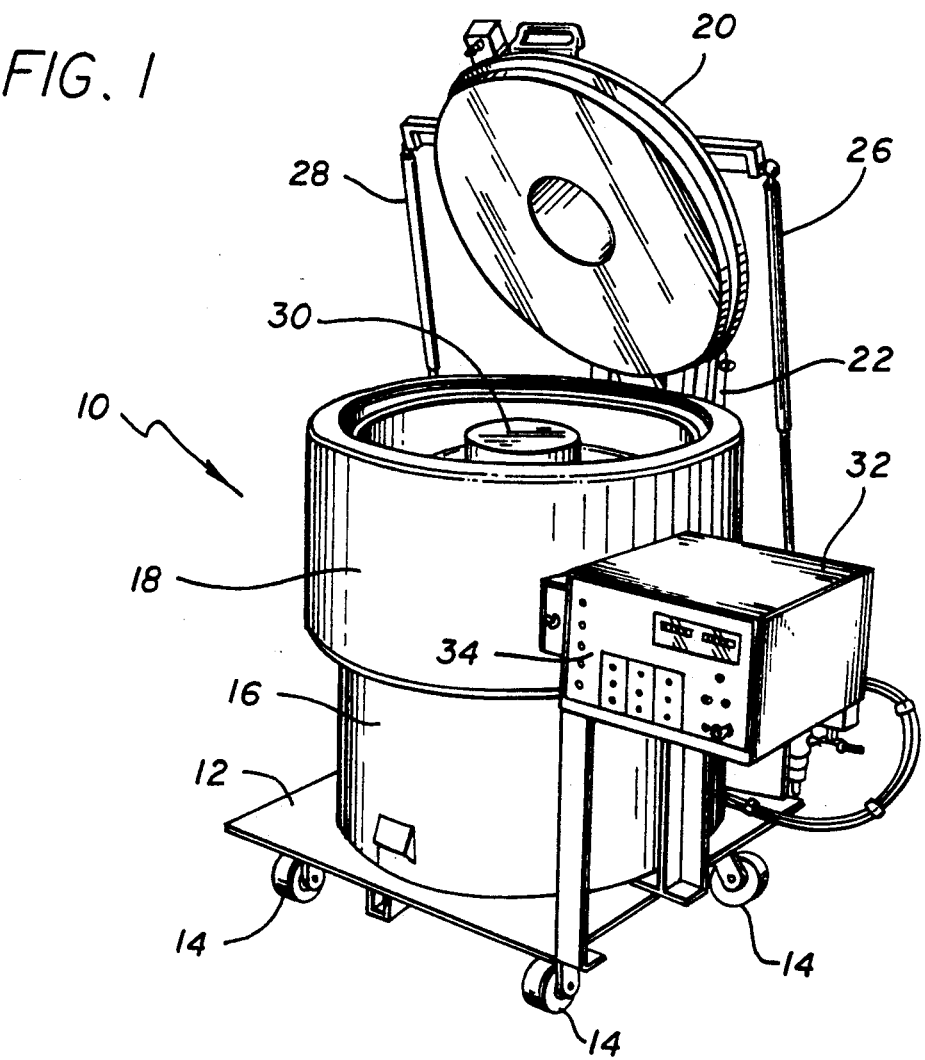
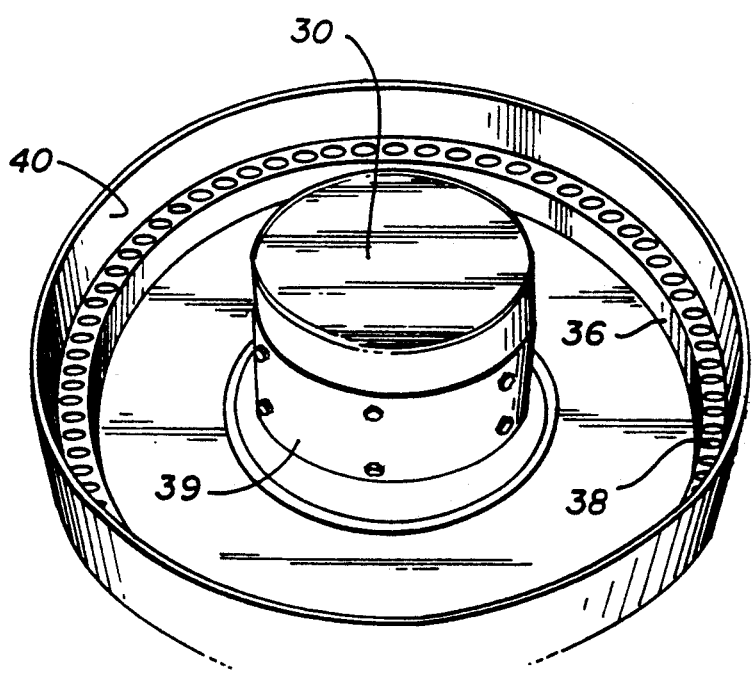

FIG. 9
FIG. 10
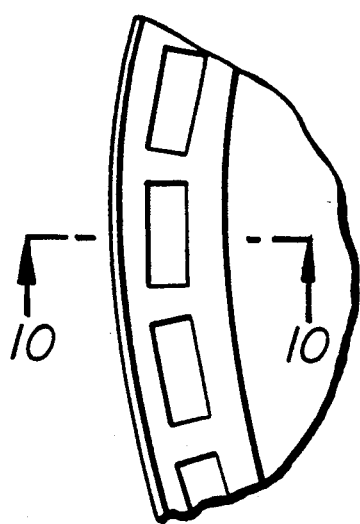
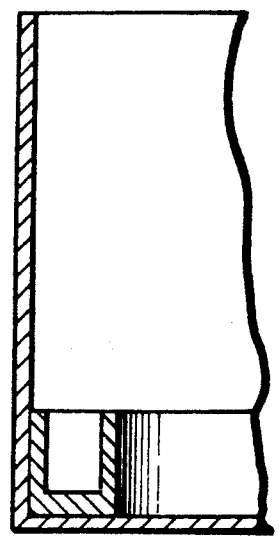
FIG. 11
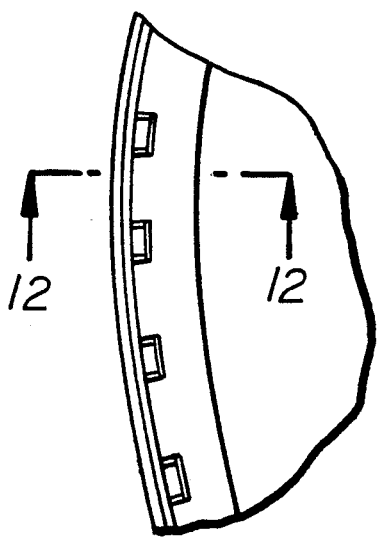
FIG. 12
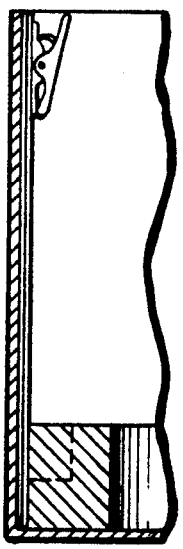
FIG. 13
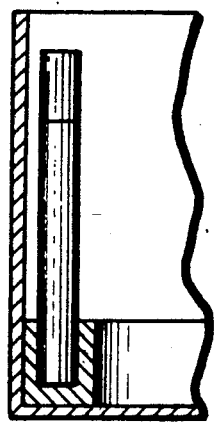
FIG. 15
FIG. 14
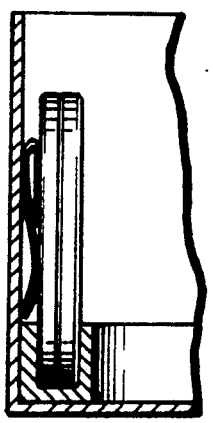

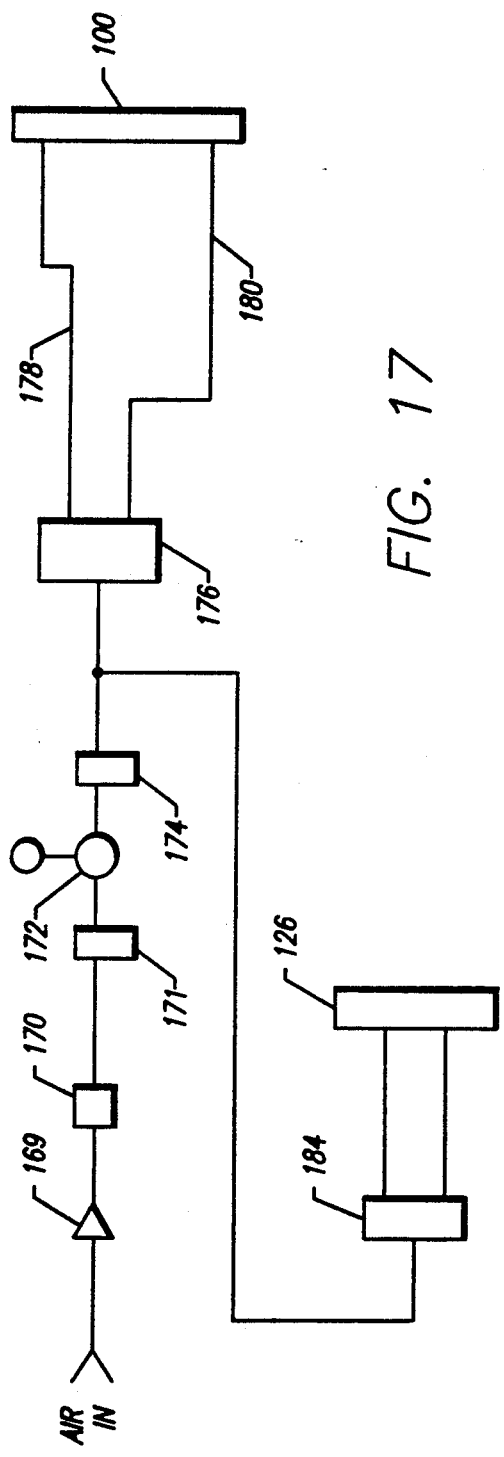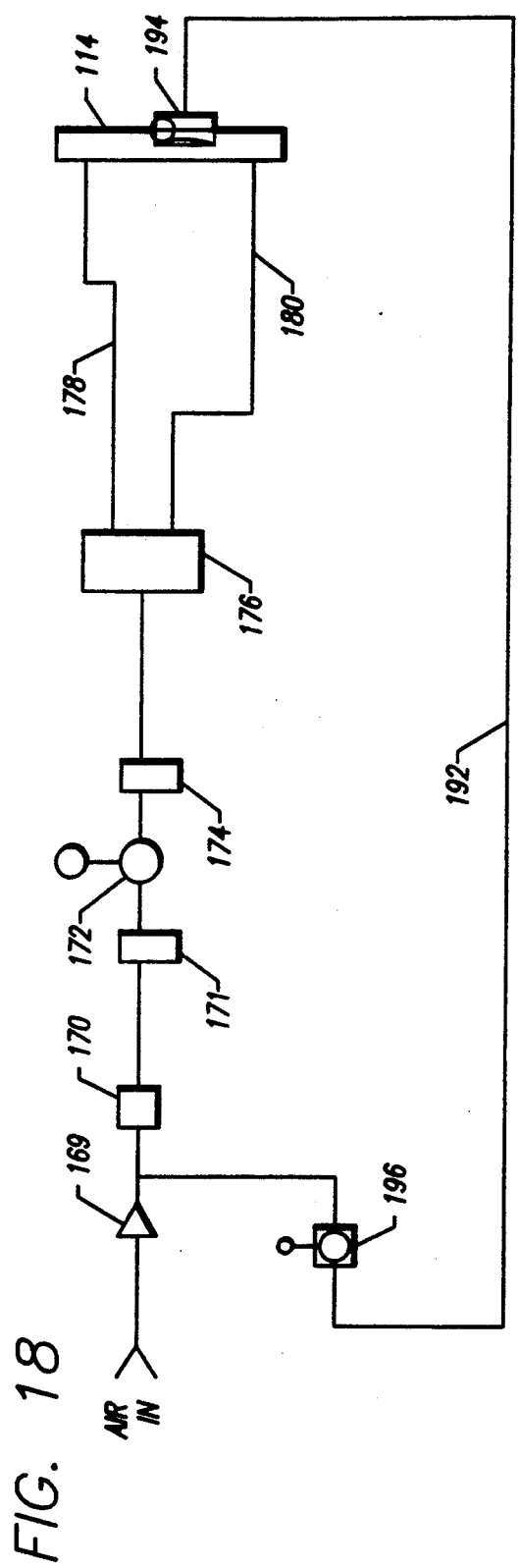
FIG. 17
FIG. 18

SELF-CONTAINED CALIBRATORS/IRRADIATORS FOR PERSONAL DOSIMETERS

BACKGROUND OF THE INVENTION

This invention pertains to a self-contained calibrator/irradiator and method for calibrating and irradiating large numbers of several types of personnel dosimetry equipment.

Operators of nuclear facilities employing large numbers of personnel have had a long standing requirement for calibrating (exposing to precisely known and reproducible fields of photon radiation, typically using 137 Cs as a source of radiation) film badges, thermoluminescent dosimeters, pocket dosimeters and electronic dosimeters. Typically these calibration procedures have been accomplished by exposing a radiation source, either manually or remotely using a calibrator in the center of a ring of dosimeters which may be 100 cm. to 120 cm. in diameter. The ring diameter will vary dependent on the dose rate to be delivered to the dosimeters. Because dosimetric equipment has widely varying ranges, multiple dose rates are required to cover the full range of dosimeters regularly used.

The use of a radiation source, whether manually or remotely controlled, to calibrate dosimeters has required a dedicated room with typical minimum dimensions of 12'×12' which is essentially clear of other materials to reduce scattered radiation effect, from which all personnel must be evacuated while radiation (calibrations) is in progress and which typically requires shielded floor, walls and ceiling to reduce radiation in surrounding areas to levels in which personnel can be present during the irradiation.

Later versions have required huge lead shielding structures and, although they did not require an entire dedicated room, they were over 1.5 meters in diameter, weighed well over 1400 kg and certainly could not be considered portable in that, once set up in a given location, they were seldom or never moved. As a result of the foregoing, it became clear to the applicant that there was a need for a much smaller calibrator/irradiator which is truly portable.

BRIEF DESCRIPTION OF THE INVENTION

Applicant has developed a completely self contained (shielded) calibrator for calibration of large numbers all types of personnel dosimetry equipment as listed above, with accuracy and reproducibility of greater than plus or minus 2%, scattered radiation component of less than 3%, which is portable (mounted on casters) in that it can be moved through standard doorways, and which has external radiation levels of less than 2 mr/hr which means that it can be used anywhere in a nuclear facility (laboratory or office) without personnel exclusion or any external shielding. Applicant's device provides automatic exposure control by means of preset time control of the radiation source exposure, multiple dose rate capability by means of automatically controlled attenuators and multiple source configuration and complete safety of operation because the cover (lid) of the exposure chamber and source exposure mechanism are completely interlocked. Multiple removable dosimeter holder racks are provided so that all types of pocket dosimeters, TLD's, film badges and electronic dosimeters may be calibrated in the same calibrator.

The device includes a shielded cylindrical chamber including a shielded lid or cover which is interlocked with the radiation source to prevent inadvertent exposure of personnel to significant levels of radiation. A shielded rod is vertically movable along the axis of the chamber to place one or more radiation sources in position to irradiate the dosimeters. Additional attenuation means may be employed to provide reduced levels of radiation. The dosimeters to be radiated are placed in any of several ring-shaped racks which are positioned on a turntable in the chamber concentrically of the source rod such that they are rotatable around the source for a time sufficient to provide essentially uniform radiation of all the dosimeters in the rack, the time being controlled manually or by a timer connected to control the drive motor.

BRIEF DESCRIPTION OF THE DRAWING

This invention may be more clearly understood from the following detailed description and by reference to the drawing in which:

FIG. 1 is a perspective drawing of a calibrator/irradiator incorporating the invention;

FIG. 2 is a perspective view of the top of the calibrator/irradiator showing the turntable, dosimeter ring and the shielded radiation source rod;

FIG. 9 is an enlarged fragmentary view of a dosimeter rack similar to that of FIG. 7, but having openings for different types of dosimeters;

FIG. 10 is a sectional drawing taken along line 10—10 of FIG. 9;

FIG. 11 is an enlarged fragmentary view of a dosimeter rack similar to that of FIGS. 7 and 9, but having openings for still different types of dosimeters;

FIG. 12 is a sectional drawing taken along line 12—12 of FIG. 11;

FIG. 13 is a sectional drawing showing a dosimeter rack similar to that of FIG. 7, but showing a dosimeter supported in the dosimeter rack;

FIG. 14 is a sectional drawing showing a dosimeter rack similar to that of FIG. 13, but with a different type of dosimeter installed.

FIG. 15 is a fragmentary sectional drawing similar to FIGS. 8, 10, and 12 showing a dosimeter supported as shown in FIGS. 5 and 6.

FIG. 17 is a schematic drawing of the pneumatic system as connected to the radiation source drive means and attenuator actuator;

FIG. 18 is a schematic drawing of a pneumatic system similar to that of FIG. 8, but including a solenoid-operated brake on the radiation source drive means.

DETAILED DESCRIPTION OF THE INVENTION

Figure 3:
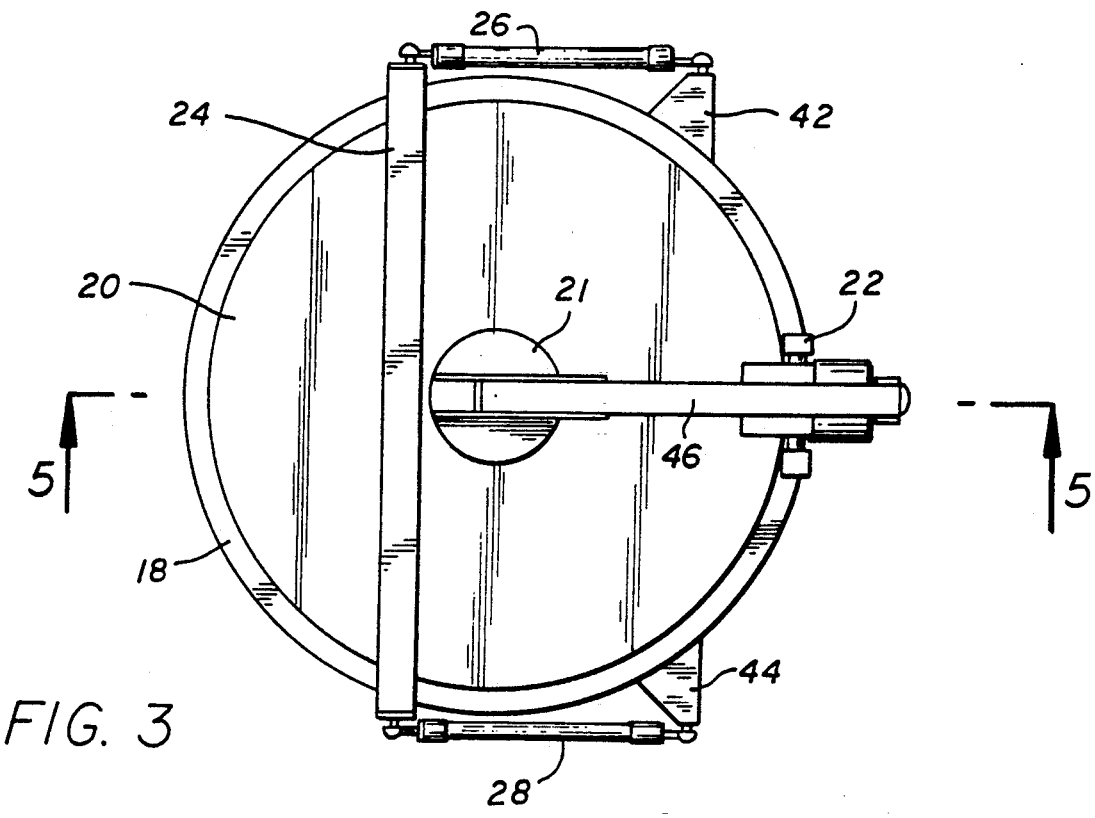
FIG. 3 is a top plan view of the cover showing part of the raising and lowering mechanism.

Referring now to FIG. 1 a calibrator/irradiator unit 10 incorporating my invention is mounted on a platform 12 supported on a plurality of wheels 14, two of which are on casters. The overall dimensions of the unit and the platform are such that the assembly can be moved around essentially as desired and since the diameter of the calibrator/irradiator is approximately 32 inches, it is easily moved through 36 inch doorways.

The calibrator/irradiator unit 10 includes a base 16 which contains among other things, a source drive system and other equipment discussed below. Supported on the base 16 is a large cylindrical container 18 which includes thick walls including lead shielding and a power operated cover or lid 20, also including heavy shielding. The cover 20 is hinged on one side of container 18 at hinge 22 and includes, on its top, a crossbar 24 having attached thereto a pair of damper rods 26, 28 which cushion the closing of the cover which is lifted by an actuator connected to an electric motor, also discussed below. Within container 18 and carried along its axis is a cylindrical shielding structure 30 including a shielded radiation source rod. Also carried on the platform 12 is an instrument cabinet 32 including a control panel 34.

FIG. 2 is a perspective view looking in the top of container 18 wherein the cylindrical structure 30 containing the source rod is shown and also a dosimeter rack 36 which includes openings 38 for receiving a large number of dosimeter units to be irradiated. Also shown in FIG. 2 is a cylindrical aluminum plate 39 which serves as a mechanical spacer and as a scatter shield as will be set forth in greater detail below. In this view only the portion inside the main shielding of container 18 is shown including a cylindrical wall 40 preferably of copper, approximately one-eighth inch thick which serves as a back scatter shield.

Figure 4:
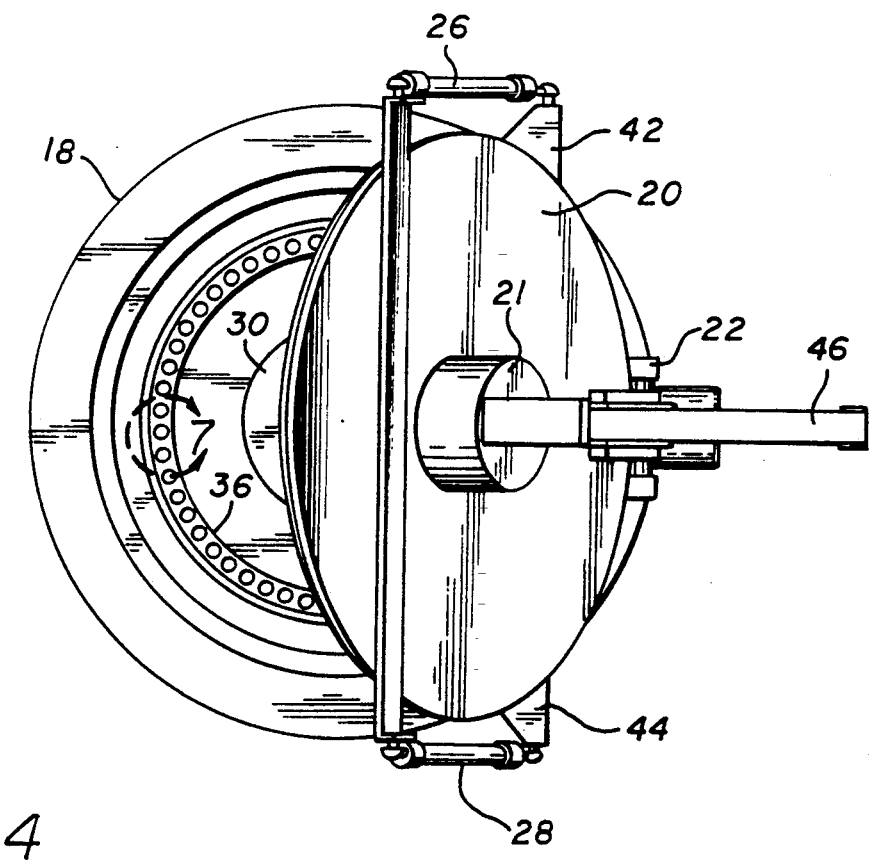
FIG. 4 is a top view showing the cover in a raised position.

FIGS. 3 and 4 illustrate closed and open positions of the lid 20 which closes the top of container 18. In FIG. 3 the cover 20 is shown closed against container 18. Also shown are the crossbar 24, damper rods 26 and 28 which are anchored at locations 42 and 44 respectively, on the platform 12, arm 46 which is part of the lid actuating structure, and hinge 22. Also shown is an upstanding centrally located cylindrical cap 21 in the center of the top of cover 20 which surrounds a corresponding cylindrical chamber accessible from the bottom of cover 20. FIG. 4, showing the cover 20 open, discloses a dosimeter rack 36 positioned in container 18, concentric with structure 30 containing the source rod.

Figure 5:
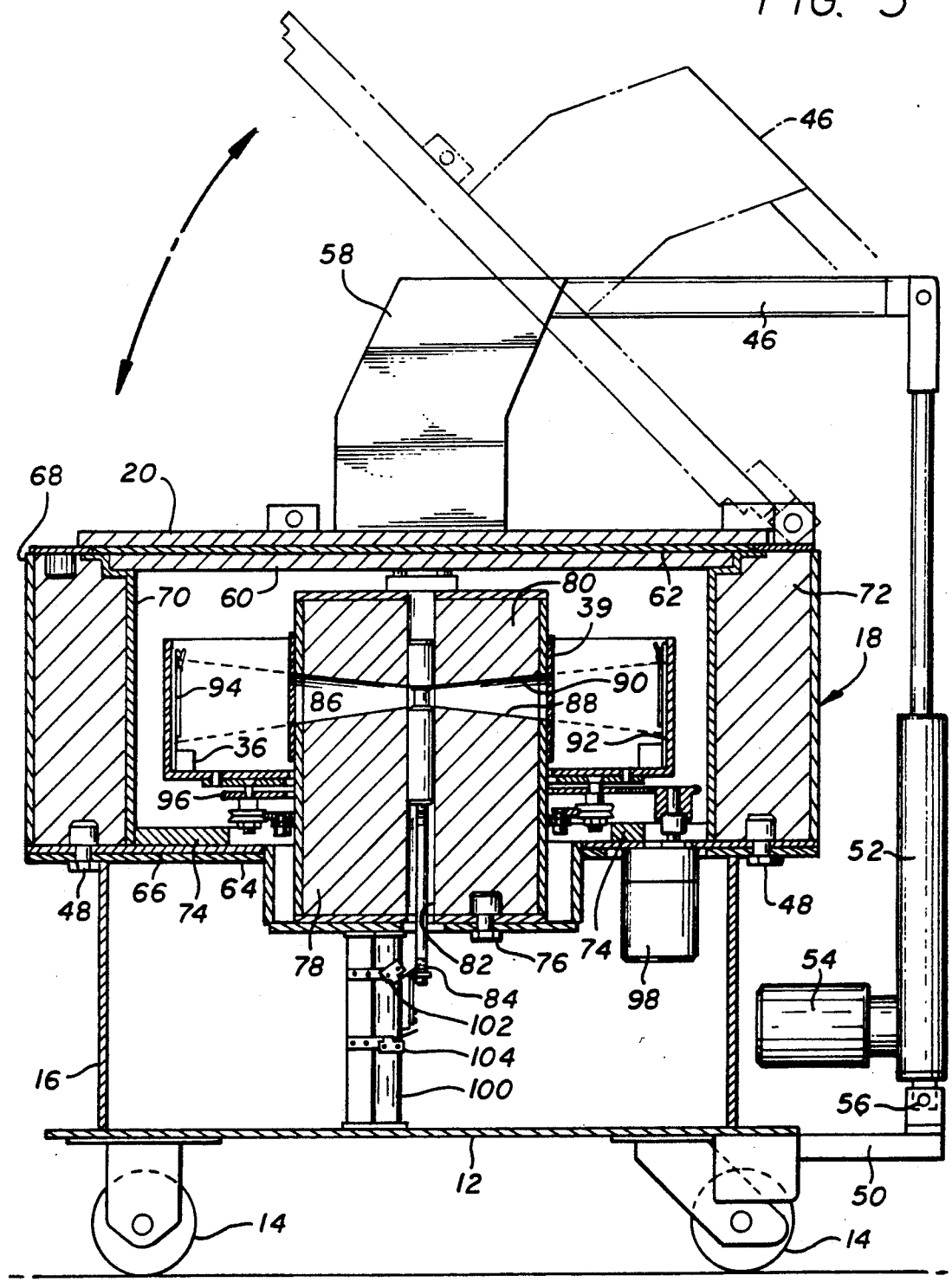
FIG. 5 is a side view, partly in section, of the calibrator/irradiator of FIG. 1.

FIG. 5 is a side view, primarily in section, of the calibrator/irradiator described in FIGS. 1-4. Platform 12 is shown, supported on wheels 14 (two of which are on casters) with the platform 12 carrying the base 16 to which the cylindrical container 18 is fastened, as by means of bolts 48. An extension 50 of platform 12 supports one end of an actuator 52 actuated by an electric motor 54, said actuator being pivotally supported on a bracket and pin 56 and having its opposite end pivotally connected to arm 46. In this view it will be observed that a link 58 extends between the outboard end of arm 46 and cover 20.

Operation of electric motor 54 and actuator 52 results in raising the cover 20 to the position shown in phantom, the actuator 52 pivoting around lower mounting bracket and pin 56 as required to raise cover 20. Cover 20 is quite heavy since it carries two layers of lead shielding 60, 62 bolted to a heavy steel lid and would have a possibility of slamming shut very quickly with possible injury to personnel should motor 54 happen to lose power unexpectedly. Damper rods 26, 28 (FIGS. 3 and 4) serve to prevent any such rapid closing.

A top plate of base 16 is shown at numeral 64 to which is bolted a bottom plate 66 of container 18. Container 18 has an external cylindral wall 68 and an internal cylindrical wall 70 serving as a backscatter shield and which is preferably of copper 0.32 cm (1/8") thick, with the space 72 between the cylindrical walls being filled with lead to form the primary shielding layer. Additional lead shielding is shown at numeral 74 on the bottom of container 18.

Fastened to base 16 as by bolts 76 is a cylindrical shield structure consisting of a lower member 78 and an upper member 80 which is axially aligned with and spaced from member 78 by means of the cylindrical scatter shield 39. A central bore 82 passes through the axis of members 78 and 80. Positioned in bore 80 and axially movable therein is a source rod 84 carrying a source of nuclear radiation 86 which, as shown, is aligned with the space between members 78 and 80. Each of members 78 and 80 includes a facing surface 88 and 90, respectively, in the form of flat conical surfaces preferably of aluminum, which surfaces, together with the heavy lead shielding in members 78 and 80, serve to provide a beam directing path for directing radiation outwardly, from source 86 along a path indicated by the dotted lines.

The radiation is directed toward a vertical internal cylindrical surface of a rotatable member 92 which is shown carrying a plurality of dosimeters 94 which are to be irradiated. There are several types of dosimeter devices which it may be desired to irradiate and calibrate, some of which may hang on the inside surface of the wall of member 92 or they may be placed in one of a number of annular dosimeter racks 36, each of which has holes, grooves or other suitable support means for a given type of dosimeter. Member 92 is attached to a turntable structure 96 driven by an electric motor 98 as described below.

When it is no longer desired to irradiate the dosimeters, the source rod 84 is translated downward, placing source 86 within the shielding of member 78. Those portions of rod 84 above and below the source 86 are of tungsten which is a very effective shielding material, so that radiation from source 86 is effectively contained and it is quite safe for personnel to open the cover 20 and remove and replace a dosimeter rack or perform other desired operations within the housing 18. Translation is effected by means of a pneumatic actuator 100. A pair of microswitches 102, 104 are operative at each end of the stroke to stop the movement. As shown in FIG. 5, the device has two positions, one being that shown where the source 86 is aligned with the beam path between members 88 and 90, and the other where rod 84 is moved downwardly to place source 86 in a position where its radiation is essentially completely shielded by the lead mass in member 78 plus the tungsten portions of rod 84.

Figure 6:
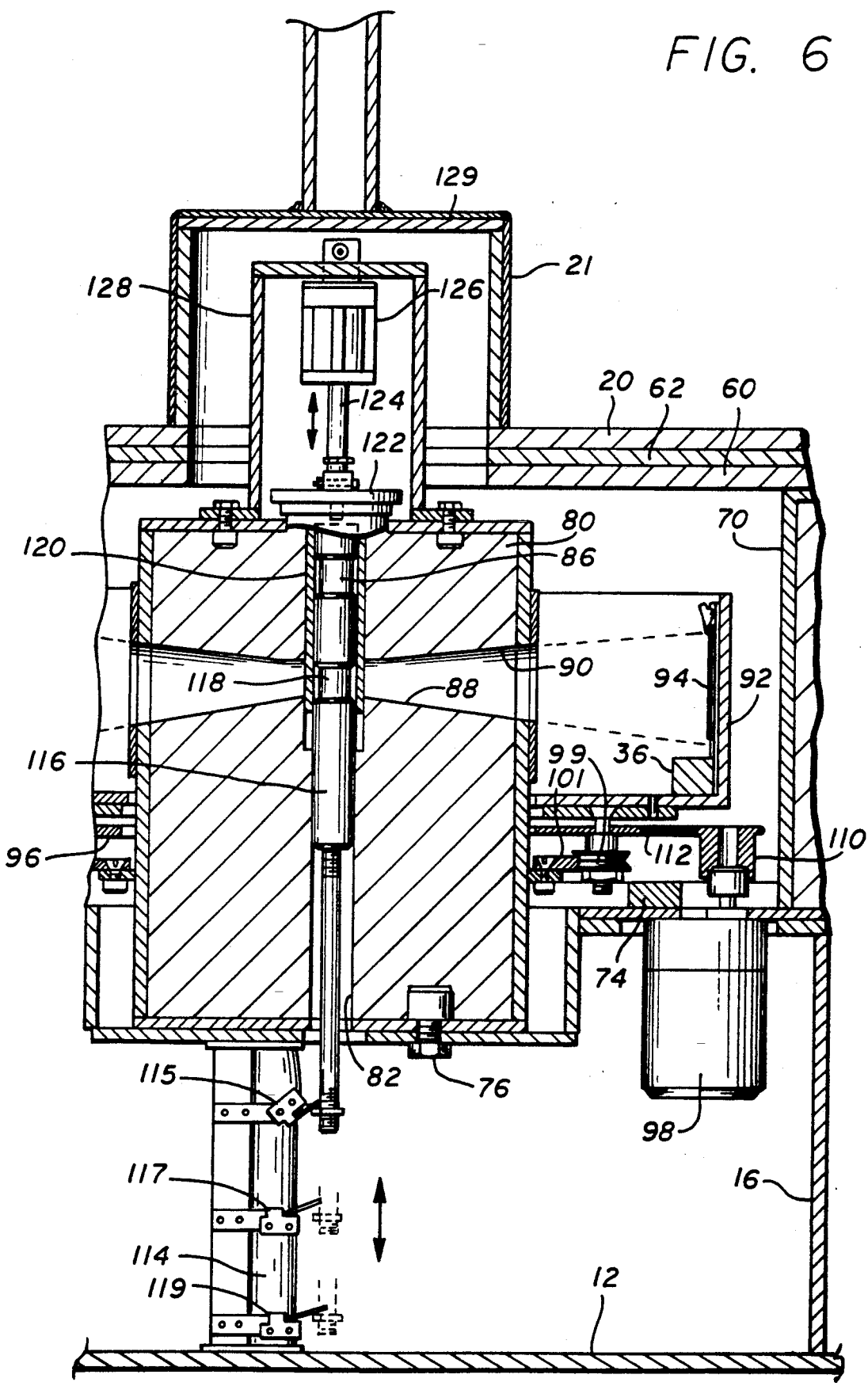
FIG. 6 is an enlarged view, primarily in section, of a modification of the device of FIG. 5 showing details of the radiation source drive means, the radiation directing structure, and the turntable and dosimeter ring and drive motor.

FIG. 6 is an enlarged view, partly in section, of a device very similar to that of FIG. 5, but with certain modifications which make it possible to supply multiple dose rates. In FIG. 6 those components which are, or may be, the same as those of FIG. 5, are given the same numerals and the structure not shown is identical with that of FIG. 5.

The electric motor 98 drives a sprocket 110 which drives a chain 112 wrapped around a turntable 96, the turntable also having sprocket teeth engaging the chain. Turntable 96 is pinned to rotatable member 92 as well as to a plurality of wheels 99 having "V" section rims and which ride on a member 101 extending radially from member 78. As will be apparent from the relative diameters of the sprocket 110 vs. the turntable 96, this assembly drives the turntable quite slowly relative to the rotational speed of the sprocket 110. Although the sources 86 and 118 radiate 360 degrees, the pattern is never totally uniform and it has been found that rotating the dosimeters provides greater uniformity in calibration.

The pneumatic actuator 114 differs from actuator 100 in that it must locate source rod 116 in any of three desired axial positions: for selecting source 86, or source 118, or for moving rod 116 to a position where both sources are shielded. As the actuator approaches any of the desired positions, it operates one of microswitches 115, 117 or 119 to stop the translation of rod 116 at the desired position. Of the two radiation sources, source 118 may be several times stronger than source 86. When source 86 is aligned with the opening between surfaces 88 and 90, as shown, the dosimeters 94 are irradiated as described above. Source rod 116 may also be moved axially upwardly to align source 118 with the opening between surfaces 88 and 90 to thereby subject the dosimeters to a stronger radiation dose. The stronger, or different dosages are appropriate for different types of dosimeters. It will be apparent that the dosimeters 94 will be subject to radiation momentarily from the upper source 86 on upward or downward translation of source rod 116 even when it is desired to use source 118. Since the exposure to source 86 in either upward or downward travel is in the order of 0.1 sec or less, and since source 118 is, or may be, ten times stronger than source 86, the momentary exposure to source 86 becomes insignificant.

The dosage of radiation to dosimeters 94 is also subject to variation through the operation of an attenuator in the form of a thin tungsten sleeve 120 movable axially downward to cover source 86 or 118, as shown, or upwardly to clear the beam path between surfaces 88 and 90. Sleeve 120 is fastened to a header member 122 which is, in turn, bolted to a rod 124 forming part of an actuator 126. Actuator 126 may be a solenoid or it may be a pneumatic actuator, and is carried within a cylindrical housing extension 128 bolted to member 80 and extending into the interior of cap member 21. The inside of cap member 21 is lined with lead shielding material 129.

Figure 7:
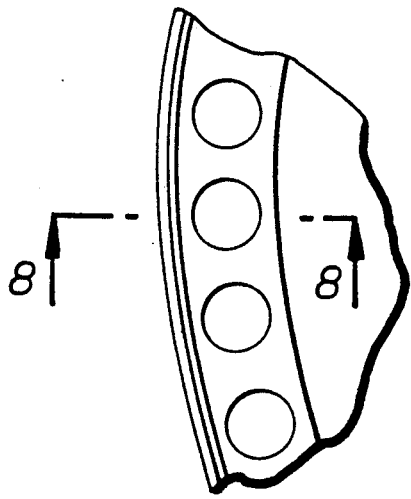
FIG. 7 is an enlarged view of the dosimeter rack or ring shown in FIG. 2.
Figure 8:
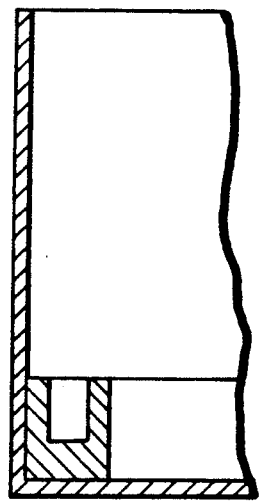
FIG. 8 is a sectional drawing taken along line 8—8 of FIG. 7.

FIGS. 7 through 15 depict a number of typical dosimeter racks which are used with the devices of FIGS. 5 and 6. FIG. 7 is an enlarged portion of FIG. 2 showing a rack with holes for dosimeters which are generally cylindrical, a cross-section appearing in FIG. 8. FIGS. 9 and 10 are similar fragmentary plan and cross-sectional views of a rack for a different type of dosimeter. FIGS. 11 and 12 show a still different configuration of rack for still different types of dosimeters. FIG. 13 shows a generally cylindrical dosimeter installed in a rack like that of FIG. 7. FIG. 14 shows a still different dosimeter installing in a rack like that of FIGS. 9 and 10. FIG. 15 is a fragmentary sectional drawing similar to FIGS. 8, 10 and 12 and showing a dosimeter suspended as shown in FIGS. 5 and 6.

Figure 16:
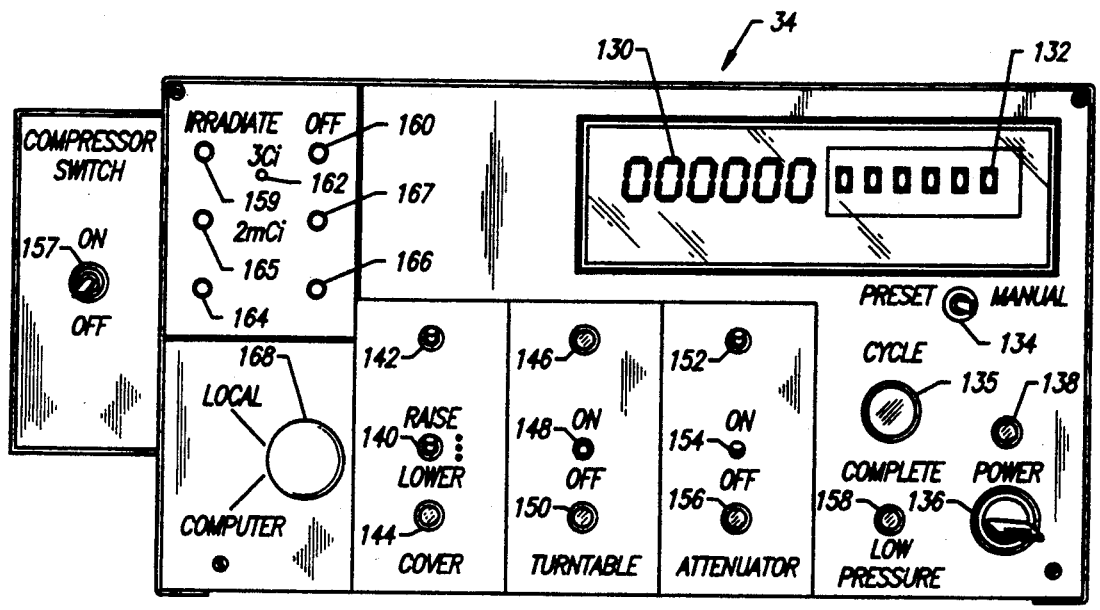
FIG. 16 is a front view of the control panel for the calibrator/irradiator described in FIG. 6.

FIG. 16 shows, in detail, the control panel 34 applicable to the embodiment of FIG. 6. Many of the functions described above are controlled from this panel which also includes a timer 130 which provides an LED display showing elapsed time of radiation and another display 132 showing remaining times for radiation. A switch 134 enables an operator to choose between manual setting and preset times.

Completion of a preset time for radiation is indicated by illumination of a large indicator light 135 which may be accompanied by an audible signal such as a buzzer. A key operated power off-on switch is shown at numeral 136 with an indicator lamp 138 showing that power is on. The means for raising and lowering the cover 20 has been discussed in part above and panel 34 includes a three-position toggle switch 140 for raising or lowering the cover 20. Indicator lamps 142, 144 indicate that the cover is raised or lowered.

Power to the turntable is indicated by lighting one or the other of lamps 146 or 150. When the turntable is energized as by turning toggle switch 148 from the "off" to the "on" position, an "on" indicator lamp 146 is lighted and when toggle switch 148 is turned to "off" position, the "off" lamp 150 is illuminated.

The attenuator also is operated from panel 34 and includes an "on" indicator lamp 152, a toggle switch 154 for switching the attenuator either into a position over the radiation source (ON) or out of such position (OFF) respectively. When the attenuator sleeve 120 is in position over either source 86 or 118, lamp 152 is turned on. When sleeve 120 is retracted, lamp 156 is illuminated. Also forming part of the panel 34 is a switch 157 for turning on the compressor (not shown) which supplies air under pressure to a pneumatic actuator. In the event that air pressure is insufficient to operate the pneumatic actuator, a lamp 158 indicates such low pressure and the operator then is made aware that he should allow more time for the compressor to build up pressure before operating the source rod actuator 114 or that there is a malfunction in the pneumatic system.

The source control part of the panel includes "irradiate" and "off" lamps 159 and 160, respectively, for source 186 which may be, for example, a 3 Ci source, and a momentary "OFF-ON" push button 162. Source 86, which may be a 2 mCi source is requested by a momentary "ON" push button 164 and when this source is in the "irradiate" position, a lamp 165 is illuminated. A second momentary OFF push button 166 is pushed to return the source 86 to shielded position. This will be indicated by illumination of an OFF lamp 167. An additional LOCAL-COMPUTER switch 168 is included to enable the operator to transfer control of some of the above functions to computer control which is not described herein since it forms no part of the present invention.

FIG. 17 is a schematic diagram of the pneumatic system as arranged to operate a two position source rod and also a two position attenuator, if the attenuator is operated pneumatically. (It may also be operated by a solenoid.) Air under pressure from a compressor, not shown, is supplied to a quick disconnect type of connector 169, to a pressure switch 170, a filter 171, a regulator and gauge 172, a Watts oiler 174 and to a four way solenoid valve 176. When the solenoid valve is in one position, a supply of air is connected through a line 178 to an actuator or cylinder 100 to drive the rod 84 (FIG. 5) in one direction. Movement of the rod results in exhaust air being delivered through a line 180 to the solenoid which then exhausts the air to the atmosphere. Selection of movement to another position results in supplying air under pressure through line 178 to the opposite end of cylinder 100 with exhaust through line 180.

Also receiving high pressure air through a line 182 is a second four way solenoid valve 184 having connections 186 and 188 to a pneumatic actuator 190 which operates attenuator sleeve 120. The solenoid valve 184 is, or may be, identical to solenoid valve 176 and includes means to alternately operate actuator 126 in one direction or the other.

A schematic diagram of a modified pneumatic system is shown in FIG. 18. In this system no circuit for the attenuator is shown (although it may be included) and a second circuit is shown operating through a high pressure line 192 to drive a solenoid operated brake 194 forming part of the three position rod actuator 114. Even with microswitches 115, 117 and 119 a brake is desired to insure that the rod 116 moves quickly and will stop at the desired intermediate position without under or overshooting. Other components which are the same as those of FIG. 9 are given the same numerals. A Watts Oiler and regulator 196 is connected in line 192. In this system actuator 114 has three positions as set forth above and solenoid valve 176, responding to a request from the control panel moves to one of its four positions to drive o actuator 114 to the desired position. This brake is not required in the case of the actuator 100 which has only two positions.

FIGS. 19A, 19B, and 19C are diagrams showing the electrical connections to the various switches and relays used in connection with the system thus far described. A power source is shown as 115 v.a.c., connected across lines 200 and 202. The power key switch 136 is connected across this supply as is a fuse 204. Closing of switch 136 illuminates lamp 138, and energizes the system shown on FIGS. 19A and 19B, the system of FIG. 19B being a continuation of that of FIG. 19A. This also energizes relay coil R1 and closes its contacts to provide power to the electronic timer 130, which circuit should be isolated such that it is protected from voltage surges from the switches and relays shown.

When it is desired to operate the calibrator/irradiator and the power is turned on illuminating power lamp 138 and the source or sources installed, one will want to open the cover 20 to install a dosimeter rack 36. If the source or sources are in the lowered or shielded position microswitch 119 is closed as shown and coil R5 is energized closing contacts R5. Operating toggle switch 140 to the RAISE position will connect power through closed contacts R5 and N.C. contacts R4 to cause actuator 52, 54 to raise the cover. The cover will then continue to open until it has reached its full open position, at which point the COVER OPEN microswitch 141 is closed to energize coil R4 which opens N.C. contacts R4 to stop the actuator 52, 54 and to illuminate COVER OPEN lamp 142. Since switch 140 is a three position switch, the operator may decide to stop the raising or lowering of the cover 20 at any point in its travel which can be done by switching toggle switch 140 back to its middle position, thereby opening the circuit to the actuator 52, 54.

When the dosimeter rack 36 is installed, operation of toggle switch 140 to the LOWER position will connect power through N.C. contacts R3 and causing the actuator 52, 54 to move in the opposite direction to close the cover 20. At approximately the point of closing, microswitch 143 is closed, energizing coil R3, opening N.C. contacts R3 and closing the circuit through N.O. contacts R3 to illuminate the COVER CLOSED lamp 144, which also closes a cover interlock.

At the time it is desired to raise the source 86 or 118 to an irradiate position, a time is designated on the timer 130 if a timed irradiation is requested, and the timer PRESET/MANUAL switch 134 selected as desired. Before one of the switches 162 or 164 is activated, contacts R5 are closed, but contacts R6 and R7 are open. This puts power through R5 across the 3Ci OFF lamp 160 and across the 20mCi OFF lamp 167. Selecting the 3Ci source by closing switch 162 will energize relay coil R3Ci, closing contacts R3Ci which closes a circuit through solenoid valve 176 and causes actuator 114 to raise the source rod 116 to the 3Ci (Source 118) position. Microswitch 119 is opened and microswitch 115 is closed which energizes relay coil R7, turning on the 3Ci "Irradiate" lamp 159.

Had the 20mCi source been chosen by switch 162, relay coil R20mCi will be energized which will energize solenoid valve 176 to cause actuator 114 to move to the intermediate position. This causes actuator 114 to reach brake microswitch 117 and energizing relay coil R6. The brake solenoid 194 is then energized to stop the rod 116 at the desired position Energizing relay coil R6 will close contacts R6 which will illuminate the 20mCi ON lamp 165.

Since there is not a significant hazard in operating the turntable 92 with the cover either open or closed, no interlock is involved in turning it on. The switch 148, if in the OFF position closes the circuit through TURNTABLE OFF lamp 146. Changing the switch 148 to the ON position disconnects lamp 146, illuminates lamp 150, energizes the turntable motor 98 and energizes relay coil R2. When this invention is used with computer control, closing contacts R2 (FIG. 19C) informs an associated computer that the turntable is operating. In addition to the turntable switch 148 on the contact panel, there is a by-pass switch 212 located elsewhere on the system for blocking use of the turntable altogether. Some operators feel that the turntable operation is not necessary and by-pass switch 212 makes it possible to operate all other functions of the system even though the turntable switch 148 is in the "OFF" position.

As indicated above, the N.O. relay contacts R3 must be closed to permit the source rod 116 to remain in an irradiating position. With contacts R3 closed, the operator may choose to place LOCAL-COMPUTER switch 168 in the LOCAL position. This is a double pole switch with contacts 168 and 168'. Placing the contacts in the LOCAL position connects the terminals marked "X" and power is connected through either of switches 148 or 212, switch 208 which is normally closed, through the timer 130 or the manual position of the preset-manned switch 134, through IRRAD switch 210 and relay coil R11. It will be observed that one contact position of the timer connects to the "CYCLE COMPLETE" lamp 135 and the sounding device or sonalert 215 thus providing both visible and audible indications that the requested timed cycle is complete. Operation in this mode is complete as described and the computer is, in effect, not connected to the system.

The relay coil R12 is connected directly across power lines 200 and 202 in series with a switch 214 which responds to pressure in the pneumatic system. Should such pressure drop below a desired value, switch 214 will close energizing relay coil R12, closing relay contacts R12 and illuminating the "LOW PRESSURE" lamp 158.

Where large numbers of batches of dosimeters 94 are to be calibrated, it is useful to connect the system to a computer which could be any IBM PC/XT/AT compatible computer. Those functions which involve significant hazards to personnel if not done correctly such as opening and closing the cover 20 are operated manually as described and are not operated through or by the computer.

Turning the LOCAL-COMPUTER switch 168, 168' to the COMP position activates relay RC1 (FIG. 19C) which is a momentary switch to activate the sources and closes contacts RC1 and RC2 which remain continuously closed during the irradiation cycle. The several relays shown on FIG. 19C are, or may be, all connected through a single connector J. When RC2 is energized, it pulls in contacts R9 thereby closing a circuit through R10 and closing contacts R10. Relay RC1 also closes contacts R11. R11 is an interlock which will cut power to the sources and drop them to the shielded position should N.O. contacts R3 for any reason, become open. The contacts 168', when in the COMP position, connect relay coil R3Ci through contacts RC3 and relay coils R20mCi through relay coil RC4. One of RC3 or RC4 is selected through the computer, the irradiation timing sequence is then controlled through the computer. The remaining relay contacts shown on FIG. 19C are closed as described above with respect to functioning in the manual mode, closing of the respective relays tells the computer which of the various functions is in operation and it, through its interval clock, times each function and makes a record of each dosimeter irradiation cycle.

While only a limited number of embodiments are shown and described herein, those skilled in the art will be aware of a number of possible modifications. While the turntable and its operation improve the accuracy of radiation, there may be those who consider the increment of improvement insufficient to justify the additional complexity. As stated above, while the actuators 100 and 114 are preferably pneumatic, other actuators such as that operating the cover and the attenuator may be either pneumatic or electrically operated. A number of switching arrangements are possible, but it must be borne in mind that an interlock must be included to present the cover from being opened when the sources 86 or 118 are in radiating position. Thus the above described embodiments are to be considered as merely descriptive of its principles and are not to be considered limiting. The scope of the present invention instead shall be determined from the scope of the following claims including their equivalents.

What is claimed is:

1. A method for calibrating dosimeter devices and the like comprising:
    positioning a number of said devices to be exposed to calibrated levels of radiation in a generally circular array within a first radiation sealable chamber;
    positioning a calibration radiation source within a second radiation sealable chamber with the calibration radiation source positioned on the axis of the said circular array of devices;
    sealing said first chamber and opening communication between the first and second chambers on the said axis;
    moving the calibration radiation source along the axis to a position generally in the plane of the devices to irradiate said devices;
    timing the period of exposure of said devices to said calibration radiation source;
    returning the calibration radiation source to the second chamber thereby sealing the second chamber from radiation emission;
    opening said first chamber; and
    removing said devices.

2. The method in accordance with claim 1 wherein said devices are positioned between back scatter shielding and said source when said source is in position to irradiate the devices.

3. The method in accordance with claim 2 wherein additional backscatter shielding defines an annular radiation path of conical cross-section extending from the source to said devices.

4. The method in accordance with claim 1 wherein the radiation source comprises a plurality of discrete sources longitudinally positioned on the axis of said circular array wherein said discrete sources may be selectively moved into position on the axis of the circular array to allow different levels of radiation.

5. A self-contained shielded calibrator/irradiator for calibrating dosimeters including a rod containing a radiation source, a shield surrounding said rod including an opening for directing radiation from said rod, a shielded housing defining a cylindrical chamber surrounding and spaced from said shield, means for driving said source rod axially in said shield between a first position wherein radiation from said radiation source is directed through said opening and a second position wherein said radiation source is substantially completely shielded, a cover including shielding means removably covering said cylindrical chamber, powered means for opening and closing said cover a turntable and, a cylindrical rack for holding said dosimeters located on said turntable and aligned with said opening such that radiation from said source will impinge upon said dosimeters and a carriage supporting said calibrator/irradiator.

6. A self-contained shielded calibrator/irradiator as claimed in claim 5 wherein said source rod includes a plurality of radiation sources and is movable axially to at least three positions, one position providing a higher dose of radiation, one position providing a lower dose of radiation and one position wherein said radiation sources are substantially completely shielded.

7. A self-contained shielded calibrator/irradiator as claimed in claim 5 wherein said shielded housing includes a cylindrical copper member adjacent the wall of said cylindrical chamber serving as a backscatter shield.

8. A self-contained shielded calibrator/irradiator as claimed in claim 5 wherein said housing and said carriage do not exceed about 35 inches in width and 54 inches in height with the lid open.

9. A self-contained shielded calibrator/irradiator as claimed in claim 5 wherein a turntable is included for rotating said cylindrical rack and said turntable is driven by an electric motor.

10. A self-contained shielded calibrator/irradiator as claimed in claim 5 wherein said means for driving said source rod includes a pneumatic power source.

11. A self-contained shielded calibrator/irradiator as claimed in claim 5 wherein electric motor means is provided for raising and lowering said cover.

12. A self-contained shielded calibrator/irradiator as claimed in claim 11 wherein interlock means is connected to said electric motor means and said means for driving said source rod such that said cover cannot be opened unless said source rod is in its position wherein said radiation sources are substantially completely shielded.

13. A self-contained shielded calibrator/irradiator as claimed in claim 5 wherein an attenuator assembly is provided including a sleeve movable over said opening to attenuate the radiation from said source rod when said rod is in a position wherein radiation is directed to said dosimeters.

14. A self-contained shielded calibrator/irradiator for irradiating dosimeters comprising:
   a source rod carrying a source of radiation including shielding means above and below said source;
   a shield around said source rod formed of two parts including an opening between said parts for directing radiation radially from said source;
   an aluminum backscatter shield covering said opening and attached to said parts to define said opening;
   a shielded housing surrounding said shield including a cylindrical chamber having a cylindrical wall spaced from said shield;
   a turntable for rotating said shield to provide a 360 degree radiation pattern from said source, and means driving said turntable;
   a dosimeter rack in said chamber positioned such that dosimeters in said rack are exposed to radiation from said radiation source; and
   means driving said source rod axially between positions wherein said source of radiation is aligned with said opening and wherein said source is substantially completely shielded.

15. A self-contained shielded calibrator/irradiator as claimed in claim 14 wherein said source rod includes a plurality of radiation sources and is movable axially to at least three positions, one position providing a higher dose of radiation, one position providing a lower dose of radiation and one position wherein said radiation sources are substantially completely shielded.

16. A self-contained shielded calibrator/irradiator as claimed in claim 14 wherein said shielded housing includes a cylindrical copper member adjacent the wall of said cylindrical chamber serving as a backscatter shield.

17. A self-contained shielded calibrator/irradiator as claimed in claim 14 wherein interlock means is connected to said electric motor means and said means for driving said source rod such that said cover cannot be opened unless said source rod is in its position wherein said radiation sources are substantially completely shielded.

18. A self-contained shielded calibrator/irradiator as claimed in claim 14 wherein an attenuator assembly is provided including a sleeve movable over said opening to attenuate the radiation from said source rod when said rod is in a position wherein radiation is directed to said dosimeters.

* * * * *